US010911801B1

(12) United States Patent
Antony et al.

(10) Patent No.: US 10,911,801 B1
(45) Date of Patent: Feb. 2, 2021

(54) CPE REAL-TIME EVENT CAPTURE AND NOTIFICATION

(71) Applicant: CSC HOLDINGS, LLC, Bethpage, NY (US)

(72) Inventors: Jaison P. Antony, Dix Hills, NY (US); Heitor J. Almeida, Elmsford, NY (US); John Markowski, Smithtown, NY (US); Peter Caramanica, Westbury, NY (US)

(73) Assignee: CSC Holdings, LLC, Bethpage, NY (US)

( * ) Notice: Subject to any disclaimer, the term of this patent is extended or adjusted under 35 U.S.C. 154(b) by 0 days.

(21) Appl. No.: 16/107,644

(22) Filed: Aug. 21, 2018

(51) Int. Cl.
| *H04N 7/173* | (2011.01) |
| *H04N 21/238* | (2011.01) |
| *H04W 12/04* | (2009.01) |
| *G06Q 30/02* | (2012.01) |
| *H04N 21/6334* | (2011.01) |
| *H04N 21/643* | (2011.01) |
| *H04N 21/81* | (2011.01) |
| *H04L 5/14* | (2006.01) |

(52) U.S. Cl.
CPC ....... *H04N 21/238* (2013.01); *G06Q 30/0277* (2013.01); *H04L 5/14* (2013.01); *H04N 21/6334* (2013.01); *H04N 21/64322* (2013.01); *H04N 21/812* (2013.01); *H04W 12/04* (2013.01)

(58) Field of Classification Search
None
See application file for complete search history.

(56) References Cited

U.S. PATENT DOCUMENTS

| 6,161,123 A | * | 12/2000 | Renouard | H04L 29/06 709/203 |
| 9,009,230 B1 | * | 4/2015 | Matthieu | H04L 69/08 709/204 |
| 9,854,317 B1 | * | 12/2017 | Abboa-Offei | H04N 21/4788 |
| 2002/0042914 A1 | * | 4/2002 | Walker | G06Q 30/02 725/36 |
| 2012/0070090 A1 | * | 3/2012 | Chang | G06F 3/005 382/218 |
| 2013/0097229 A1 | * | 4/2013 | Webb | H04W 8/245 709/203 |

(Continued)

OTHER PUBLICATIONS

Internet Engineering Task Force (IETF), Request for Comments: 6455, "The WebSocket Protocol", Dec. 2011 (Year: 2011).*

*Primary Examiner* — William J Kim
(74) *Attorney, Agent, or Firm* — Sterne, Kessler, Goldstein & Fox P.L.L.C.

(57) ABSTRACT

An event capture and notification system (ECN), and applications thereof. In an embodiment, the ECN permits communication between customer premises equipment (CPE) and a server (such as a back-end server) of a service provider. The real-time ECN system includes a method for communicating real-time notifications between a CPE device and a server. The ECN system may include methods and components to communicate captured events through a communication channel by which client device events may be transmitted in real time to a server, and vice versa. The ECN system may include a full-duplex communication channel for communicating events. By the ECN system, communication between a CPE device and a server may be realized efficiently and timely.

24 Claims, 7 Drawing Sheets

(56) References Cited

U.S. PATENT DOCUMENTS

| | | | | |
|---|---|---|---|---|
| 2014/0044123 | A1* | 2/2014 | Lawson | H04L 65/1023 370/352 |
| 2014/0108618 | A1* | 4/2014 | Lee | H04L 12/2838 709/219 |
| 2014/0156725 | A1* | 6/2014 | Mandyam | H04L 67/02 709/203 |
| 2014/0165095 | A1* | 6/2014 | Miller | H04N 21/44016 725/34 |
| 2014/0207957 | A1* | 7/2014 | Zhang | H04L 67/02 709/227 |
| 2014/0222963 | A1* | 8/2014 | Gangadharan | H04L 65/1016 709/219 |
| 2015/0095777 | A1* | 4/2015 | Lim | H04L 67/02 715/716 |
| 2015/0113049 | A1* | 4/2015 | Kawamori | H04L 67/1097 709/203 |
| 2015/0207904 | A1* | 7/2015 | Siegman | H04N 21/2343 709/217 |
| 2015/0256626 | A1* | 9/2015 | Ajitomi | H04L 67/141 709/227 |
| 2015/0261782 | A1* | 9/2015 | McFerrin | G06F 16/178 707/625 |
| 2015/0281337 | A1* | 10/2015 | Samson | H04L 67/10 709/201 |
| 2016/0006817 | A1* | 1/2016 | Mitic | H04L 65/4076 709/232 |
| 2016/0085488 | A1* | 3/2016 | Otake | H04N 1/00127 358/1.14 |
| 2016/0119399 | A1* | 4/2016 | Glass | H04N 19/44 709/219 |
| 2016/0142477 | A1* | 5/2016 | Kawazoe | H04L 67/1025 709/203 |
| 2017/0237964 | A1* | 8/2017 | Maenpaa | H04N 13/332 348/39 |
| 2018/0159902 | A1* | 6/2018 | Murphy | H04L 67/02 |

* cited by examiner

CPE REAL-TIME EVENT CAPTURE AND NOTIFICATION

BACKGROUND

Service providers may provide media content and advertisements to subscribers or users through a client device, such as Customer Premises Equipment (CPE) devices and other Internet Protocol (IP) enabled devices. The client device may generally include an interface to enable dialog between a user operating the client device and a server. The user may operate the client device (utilizing a remote control, for example) to send a communication to the server and/or the client device may itself initiate a communication to the server. Communications may be performed by communicating a Hypertext Transfer Protocol (HTTP) request from the client device to the server and receiving data as a response from the server. A request may be done using a batch operation (also referred to as long-polling) in which the connection is terminated following a response from the server. Event capture and notification between a CPE device and a server of a cable network is beneficial for service provider operations. However, limitations of conventional networks and batch operations create barriers and resource costs to communicate such events in real time.

BRIEF DESCRIPTION OF THE DRAWINGS

The accompanying drawings, which are incorporated herein and form part of the specification, illustrate the present disclosure and, together with the description, further serve to explain the principles of the disclosure and to enable a person skilled in the relevant art to make and use the disclosure.

FIG. 4 illustrates a flowchart of a server process in a real-time event capture and notification system, according to an example embodiment.

DETAILED DESCRIPTION

Overview

Figure 1:
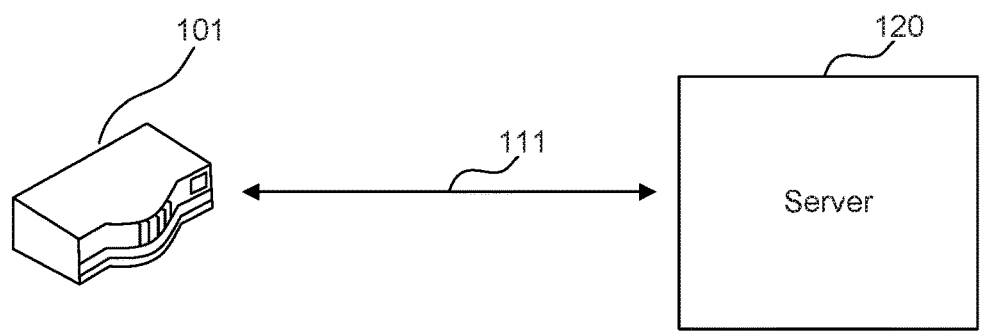
FIG. 1 illustrates a CPE real-time event capture and notification system, according to an example embodiment.

Service providers provide media content, such as audio, video, and/or data, to provide some examples, and advertisements to subscribers or users client devices. For example, subscribers select the media content to view using a CPE device interface (or other IP enabled device interface). The CPE and IP enabled devices may capture or register the selection as a CPE event and notify the service provider of the selected media content. Conventional CPE and IP enabled devices transmit the CPE event as data sent to a server of the service provider by using a batch operation. In this conventional situation, the service provider may not be immediately notified of media content selection, and notification of the CPE event may instead be deferred for some period of time.

Moreover, creating an HTTP request for each batch operation for conventional CPE and IP enabled devices to perform such event notification, for example, encoded in Hypertext Markup Language (HTML), requires repetitive socket creation and destruction. Conventionally, every time an HTTP request is made, headers, event and/or session data are transferred to the server. This can ultimately add up to a large amount of data to transfer requiring longer notification intervals and/or affecting the latency of conventional CPE and IP enabled devices.

The subscribers may not be interested in or relate uniformly to the same media content and advertisements. There is increasing demand on the part of subscribers for interactive and programmatic television media content and advertisements. Likewise, there is increasing demand by advertisers to discern viewership trends and data in real time, for example, to learn whether a given advertisement campaign has been effective as early as possible.

As a result of the foregoing notification interval, conventional CPE and IP enabled devices may not be sufficiently timely in their delivery of captured events. Thus, it may be difficult for service providers to harness data in a sufficiently prompt manner for advertisers to target the right audiences or for service providers to deliver customized programming and advertising. Accordingly, advertisements may be more effective when advertisements can be delivered based on the individual viewer or household, rather than generalized delivery to all subscribers.

The systems and methods disclosed herein provide real-time CPE event capture and notification, to enable timely and persistently communications between a CPE or IP enabled device and a service provider. The ECN system avoids the use of batch and send operations in managing instructions and/or information. As a result, service providers can acquire and utilize real-time information from client devices minimizing delay and unnecessary overhead.

In the detailed description herein, references to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described.

The foregoing description of specific embodiments will so fully reveal the general nature of the invention that others can, by applying knowledge within the skill of the art, readily modify and/or adapt for various applications such specific embodiments, without undue experimentation, without departing from the general concept of the present invention. Therefore, such adaptations and modifications are intended to be within the meaning and range of equivalents of the disclosed embodiments, based on the teaching and guidance presented herein. It is to be understood that the phraseology or terminology herein is for the purpose of description and not of limitation, such that the terminology or phraseology of the present specification is to be interpreted by the skilled artisan in light of the teachings and guidance.

A. Real-Time Event Capture and Notification

FIG. 1 is a diagram that illustrates components of a CPE real-time event capture and notification system (ECN) 100. As to be described in further detail below, ECN 100 captures and transmits, in real time, CPE events to a server using a specialized, persistent communication channel. As illustrated in FIG. 1, ECN 100 includes a CPE device 101, a server 120, and communication channel 111 for transmitting and receiving communications.

In the exemplary embodiment illustrated in FIG. 1, CPE device 101 generally refers to any electronic device which is located at a premises of a customer of a service provided by server 120. CPE device 101 can include one or more personal computers, data terminal equipment, one or more telephony devices, such as one or more mobile phones or one or more mobile computing devices to provide some examples, one or more broadband media players, one or more network-controlled appliances, one or more set-top boxes, one or more wireless routers, and/or other devices that are capable of transmitting and/or receiving video, audio, and/or data that will be apparent to those skilled in the relevant art(s) without departing from the spirit and scope of the present disclosure.

During operation, CPE device 101 and server 120 establish communication channel 111. In an exemplary embodiment, the establishment of communication channel 111, as well as any subsequent communication, can be predefined in accordance with a communication standard or protocol, such as Websocket to provide an example. In some situations, CPE device 101 and/or server 120 can establish communication channel 111 in response to an initializing event, such as powering-on, initializing, and/or associating of CPE device 101 to provide some examples, associated with CPE device 101. In the exemplary embodiment illustrated in FIG. 1, communication channel 111, once established, represents a persistent communication channel which remains open until occurrence of a terminating event, such powering-off, de-initializing, and/or de-associating of CPE device 101 to provide some examples, associated with CPE device 101. In some situations, communication channel 111 remains open even if information is not being communicated between the CPE device 101 and server 120. In these situations, the CPE device 101 can communicate information, such as CPE events, to the server 120 using communication channel 111 in real-time, or near real-time, without having to re-establish communication channel 111 for each communication. Real time" as used herein refers to the continuous processing of messages at the time the associated event occurs without storing messages for later transmission. Thus, real time is different from batching, long-polling or "on-demand" event reporting. Real time message processing does not necessarily infer "live" processing. That is, it is not a requirement that any potential throughput delay be avoided for a communication to be processed in real time.

In the exemplary embodiment illustrated in FIG. 1, the CPE device 101 can capture and/or communicate the CPE events to the server 120. Generally, the CPE events represent any type of user interaction with CPE device 101. The CPE events can include selection and duration of a television channel being viewed, VOD content purchases being requested, etc.). For example, the user of CPE device 101 may view a first television channel for five minutes and switch to a second television channel for the next hour. These CPE events may be captured by CPE device 101 and transmitted to server 120. CPE device 101 may capture and transmit such events. In some situations, CPE device 101 may capture those activities occurring greater than a minimum dwell time, for example, a minimum time spent by a user on a given channel. This dwell time prevents CPE device 101 from capturing activities, such as channel surfing to provide an example, as CPE events which occur less than the minimum dwell time.

In the exemplary embodiment illustrated in FIG. 1, server 120 can utilize communication channel 111 for communicating information to CPE device 101. For example, the server 120 may transmit a notification to the CPE device 101 when the server is notified of a notification event. Such events may include, for example, account and payment notifications, network notifications such as information about maintenance and service issues, software and data updates, caller ID notifications, emergency warnings, etc.

B. CPE Real-Time Event Capture and Notification System

Figure 2:
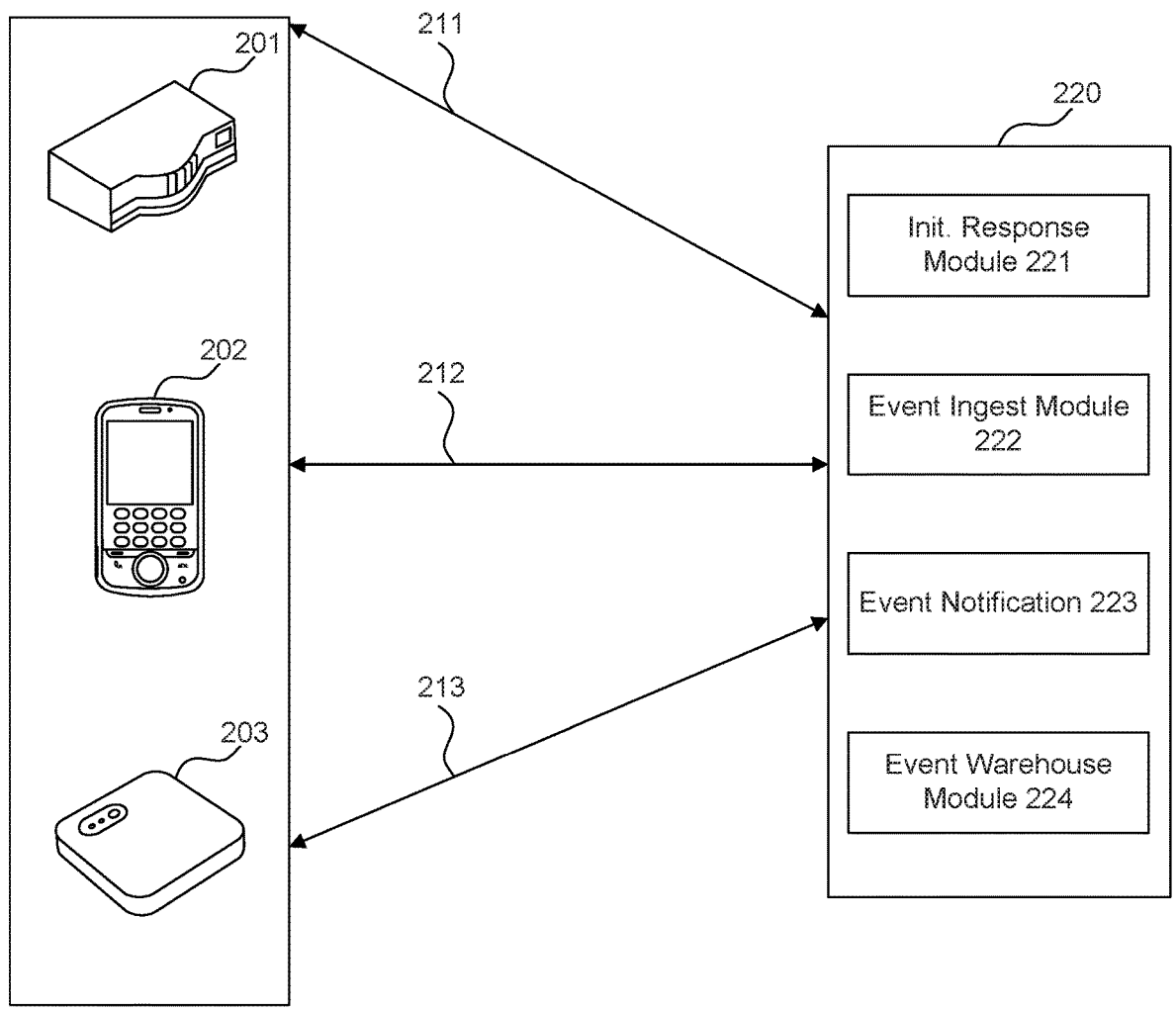
FIG. 2 illustrates event producers and consumers in a CPE real-time event capture and notification system, according to an example embodiment.

As shown in FIG. 2, ECN System 200 may include client devices such as STB (set-top box) 201, mobile device 202 and/or IPTV client 203 to provide some examples. Each of the client devices 201 through 203 may be respectively configured to communicate with server 220 by a communication channel 211 through 213, each being substantially similar to communication channel 111 as described above in FIG. 1.

For example, when STB 201 is booted/powered-up, STB 201 establishes communication channel 211 with the server 220. In one embodiment described in further detail below, STB 201 may initiate the request by sending a request to communicate utilizing a persistent protocol, such as Websocket, server sent events (SSE), or other suitable protocol. STB 201 and server 220 can authenticate the communication channel 211 using suitable means. Likewise, mobile device 202, IPTV client 203 and other CPE and/or CPE-connected devices may request to communicate with server 220 with similar communication channels 212 and 213, respectively. In some embodiments, communication channels 211-213 may each comprise multiple communication channels.

In an embodiment, server 220 may be configured to include one or more computer modules, including modules 221 through 224, to provide functions of establishing communication channels, ingesting and transmitting events, and warehousing the events for further processing and analysis.

In an embodiment, an ECN Initialization Response Module 221 may include one or more servers (not shown) executing one or more applications arranged to receive communication requests from client devices 201 through 203. ECN Initialization Response Module 221 may process communication channel requests between server 220 and client devices 201 through 203. ECN Response Module 221 may establish and/or acknowledge full-duplex communication channels 211 through 213 to provide a real-time communication channel between the server 220 and each client device 201 through 203, respectively.

An ECN Event Ingest Module 222 may include one or more servers (not shown) executing one or more data ingestion applications arranged to ingest event notifications in real time from client devices 201 through 203 through, respectively, the full-duplex communication channels 211 through 213. The ingested data may include service viewing events (e.g., channel changes), VOD content viewing events and any event involving an interaction of the subscriber with the associated client device. The ingested data may further include audit events including system, hardware and application events associated with the subscriber's client device with or without interaction by the subscriber.

An ECN Event Notification Module 223 may include one or more servers (not shown) executing one or more notification applications arranged to transmit notification messages in real time to client devices 201 through 203 through, respectively, the full-duplex communication channels 211 through 213. The notification message may include, for example, account notifications with respect to an account associated with the subscriber, such as a new subscription bill or a payment past due notification. Additionally, the notification data may include messaging events, such as caller ID or text message events (e.g., notification in real time of an incoming phone call or text message to a phone number associated with the subscriber).

Additional example notification messages may include software, such as patches and operating system updates, and other notifications involving the associated client device. In one non-limiting example, a subscriber associated with client device 201 may request technical assistance from the service provider. An agent of the service provider responding to the subscriber's request may cause ECN Event Notification Module 223 to send a notification message to client device 201 that includes a technical instruction. Such instruction may cause the client device 201 to transmit technical data to server 220, also through communication channel 211, such that the agent may investigate the technical data in real time. Alternatively or additionally, the instruction may include a command causing the client device 201 to reboot. Another non-limiting example may include transmission by ECN Event Notification Module 223 of data and image to be utilized by the client device, e.g., updating any image data such as a network or video-on demand logos that are stored on the client device.

An ECN Event Warehouse Module 224 may include one or more servers (not shown) executing one or more data warehousing applications arranged to data warehouse events associated with client devices 201 through 203 for applications for processing and using such data (including by other systems and externally) for reporting and analysis. Non-limiting examples of such applications may include data mining, analytical processing, behavioral targeting of advertisements, market research and decision support.

A plurality of client devices can thus provide notification to the service provider of captured events and receive notifications from the service provider through the ECN system 200. The service provider and/or each client device may then, also in real time, process and utilize the information associated with the events.

As shown in FIG. 2, ECN system 200 may include a plurality of ECN connected client devices (e.g., client devices 201 through 203). A service provider may broadcast notifications to all or a subset of all client devices. For example, if a an outage affecting one or more provided services occurs or may be expected to occur in a geographic area, the service provider may identify any client devices operating in the geographic area and broadcast a group notification to any such client device in real time. Alternatively, for example, the service provider may push a patch or update to all client devices in the selected geographic area.

ECN system 200 provides the above-mentioned advantages in minimizing the requirement to recreate and terminate connections between the client devices and the server. By providing a persistent, full-duplex channel, the connection may be maintained and bandwidth may essentially be limited to data specifically associated with a notification. That is, data overhead involved with half-duplex systems, such as systems that rely solely on HTTP protocol and batch operations to communicate events, may be avoided by maintaining the full-duplex channel.

Moreover, by providing information in real time, event data may be received and utilized by a service provider more effectively. For example, channel viewing data of a client device may be ingested in real time by server 220 for processing and behavioral targeting of advertisements to that client device. By providing the real-time communication channel, advertisements can be more effectively be targeted to the subscriber based on contemporaneous analysis of interests or demographics. Likewise, a service provider utilizing ECN System 200 can ingest events from devices associated with television subscribers in real time. Thereby, the service provider can be enabled to identify viewership of content, television channels and programming, across the entire system and/or in specific demographic/interest groupings.

ECN System 200 minimally requires that a client device such as STB 201, mobile device 202, IPTV client 203 and other IP-enabled devices. One feature of ECN System 200 is that the present system may be embodied by a wide variety of client devices having differing configurations, operating systems and environments. For example, the ECN System 200 may be implemented on STBs of different vendors, models, generations, specifications, etc.

C. Real-Time ECN Enabled Client Device

Figure 3:
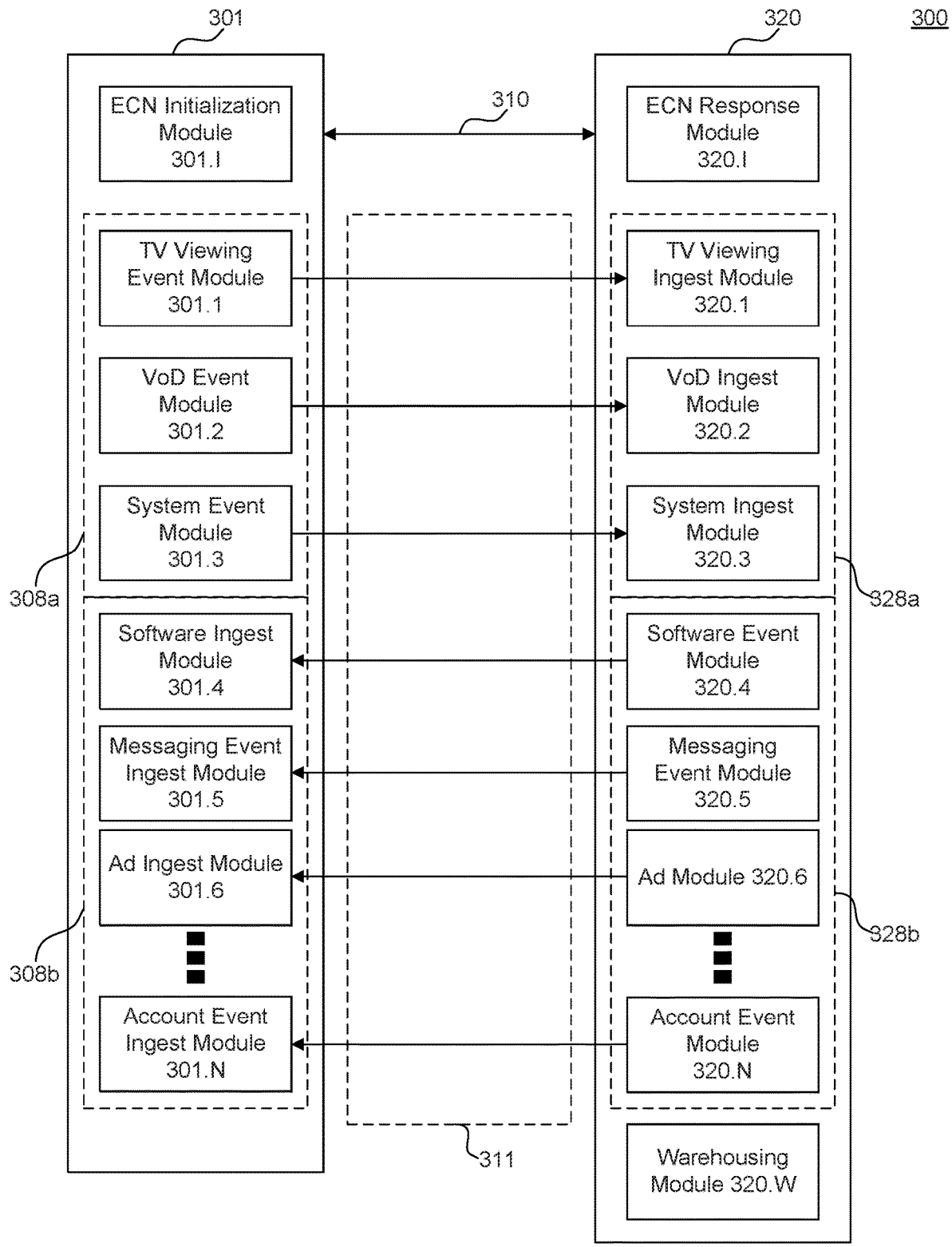
FIG. 3 illustrates a CPE real-time event capture and notification system, including a plurality of client devices according to an example embodiment.

In an embodiment, FIG. 3 depicts a client device 301 that may be configured to include one or more computer modules, including modules 301.1 and 301.1 to 301.N (where N is a number greater than 1) to interact with server 320. Server 320 (which may be an embodiment of server 120 or server 220, described above) may be configured to include one or more computer modules, including modules 320.1, 320.W and 320.1 to 320.N (where N is a number greater than 1). As in the above disclosure, modules may be classified as event notification modules (i.e., event notification modules 308a on client device 301 side, and 328b on server 320 side) or event ingest modules (i.e., event ingest modules 308b on client 301 side, and 328a on server 320 side).

In a non-limiting example, ECN initialization module 301.1 may include one or more applications to communicate through communication channel 310 with server 320. Thereby, ECN Initialization Module 301.1 may request and/or establish a full-duplex communication channel 311 with server 320. ECN initialization module 301.1 may be executed at or shortly after client device 301 is powered-on. Alternatively or in addition, ECN Initialization Module may function to connect the client device 301 through a full-duplex communication channel to server 320 after the client device has been connected or reconnected to a network (e.g., after a network interruption). In this regard, ECN Initialization Module 301.1 may be configured to automatically reconnect in the event of channel disruption, due to network connectivity problems, CPE device reset, a command received from server 320, or the like. Generally, communication channel 311 can be maintained and persist until the client device 301 is powered off or otherwise deactivated, without necessitating a new channels to be created for every communication.

On the server 320 side, ECN Response Module 320.1 may include one or more applications to communicate through communication channel 310 with client device 301, for example, to handle full-duplex communication requests received from ECN Initialization Module 301.1. That is, ECN Initialization Module 301.1 of client device 301 and ECN Response Module 320.1 of server 320 interact and operate to establish a full-duplex communication channel 311 for use as described below.

Television Viewing Event Module 301.1 may include one or more applications to capture and transmit a television viewing event in real time to server 320. In a non-limiting example, a user of the client device may register a television viewing event, such as a channel change, to the client device by a remote control or other input device. Upon capture, the television viewing event information may be transmitted to the server 320 through the full-duplex communication channel 311. Television Viewing Ingest Module 320.1 of server 320 receives the transmitted television viewing event information from Television Viewing Event Module 301.1 and processes the television viewing event information, for example, by inputting information to an Ad Event Module 320.6 and/or Warehousing Module 320.W, as described below.

VOD Event Module 301.2 may include one or more applications to capture and transmit a television viewing event in real time to server 320. In a non-limiting example, a user of the client device may register a VOD event, such as selecting on-demand video content from the service provider or a third party provider, to the client device by a remote control or other input device. Upon capture, the VOD event information may be transmitted to the server 320 through the full-duplex communication channel 311. VOD Ingest Module 320.2 of server 320 receives the transmitted VOD viewing event information from VOD Event Module 301.2 and processes the VOD event information, for example, by inputting information to an Ad Event Module 320.6 and/or Warehousing Module 320.W, as described below.

System Event Module 301.3 may include one or more applications to capture and transmit a system event in real time to server 320. In a non-limiting example, the client device may handle a system event, such as an error or other informational message generated by one or more of the client device operating system, client device hardware, application software or client device user. The system event may be captured and information describing the system event may be transmitted to the server 320 through the full-duplex communication channel 311. Similarly, the client device 301 may receive a command, potentially in response to a notification received by Software Ingest Module 301.4, described below, to transmit technical data to server 320 through the full-duplex communication channel 311. At server 320, System Ingest Module 320.3 receives the transmitted system information from System Event Module 301.3 and processes the system information, for example, by inputting information to Warehousing Module 320.W, as described below.

On server 320 side, Software Event Module 320.4 may include one or more applications to push or transmit commands and/or software to client device 301. In an embodiment, such commands may include a request for the client device 301 to capture and send technical data, as described above, to retrieve new or updated software, or to reboot the client device 301. Software Ingest Module 301.4 of client device 301 may include one or more applications to receive software events including, not limited to, the above-mentioned commands and software from server 320 in real time.

Messaging Event Module 320.5 of server 320 may include one or more applications to receive and transmit one or more messaging events in real time to client device 301. In a non-limiting example, a messaging notification with respect to a message associated with the subscriber, such as a text message or caller ID information relating to an inbound phone call, is enqueued to the Messaging Event Module 301.5 from an external module or system (not shown). Upon entry on the queue, the messaging event may be transmitted to the client device 301 associated with the subscriber through the full-duplex communication channel 311. Messaging Event Ingest Module 301.5 of client device 301 may receive a message in real time from Messaging Event Module 301.5 through full-duplex channel 311. Thereby, Messaging Event Ingest Module 301.5 may execute a process to cause client device 301 to output the message such that it may be viewable to the user.

Ad Module 320.6 of server 320 may include one or more applications to transmit an advertisement, such as a television advertisement, and/or information about an advertisement in real time to client device 301. In a non-limiting example, Ad Module 320.6 may retrieve television advertisements from a central ad server and may associate, or receive information associating, a television advertisement with all client devices or a subset of all client devices that includes client device 301. Ad Module 320.6 may transmit information about the advertisement to the client device 301 through the full-duplex communication channel 311. Advertisement information may include the advertisement and/or information necessary to identify the intended advertisement. Ad Ingest Module 301.6 of client device 301 may receive information about the advertisement associated with an advertisement in real time from Ad Module 301.6 through full-duplex channel 311. Accordingly, Ad Ingest Module 301.5 may execute a process to cause client device 301 to output the advertisement such that it may be viewable to the user.

Account Event Module 320.N may include one or more applications to receive and notify a subscriber of one or more account events in real time to client device 301. In a non-limiting example, an account notification with respect to an account associated with the subscriber, such as a bill or a payment past due notification, is transmitted to the Account Event Module 320.N, for example, by one or more account servers (not shown). Upon entry on the queue, the account event may be transmitted to the associated client device 301 through the full-duplex communication channel 311.

Warehousing Module 320.W may include one or more applications to enqueue events received by ECN 300 to a messaging queue (not shown). In an embodiment, a messaging queue may deliver the warehoused data to persist data including the events, and/or for further analysis and processing by other applications. An exemplary application including a messaging queue is described in further detail below.

Figure 4:
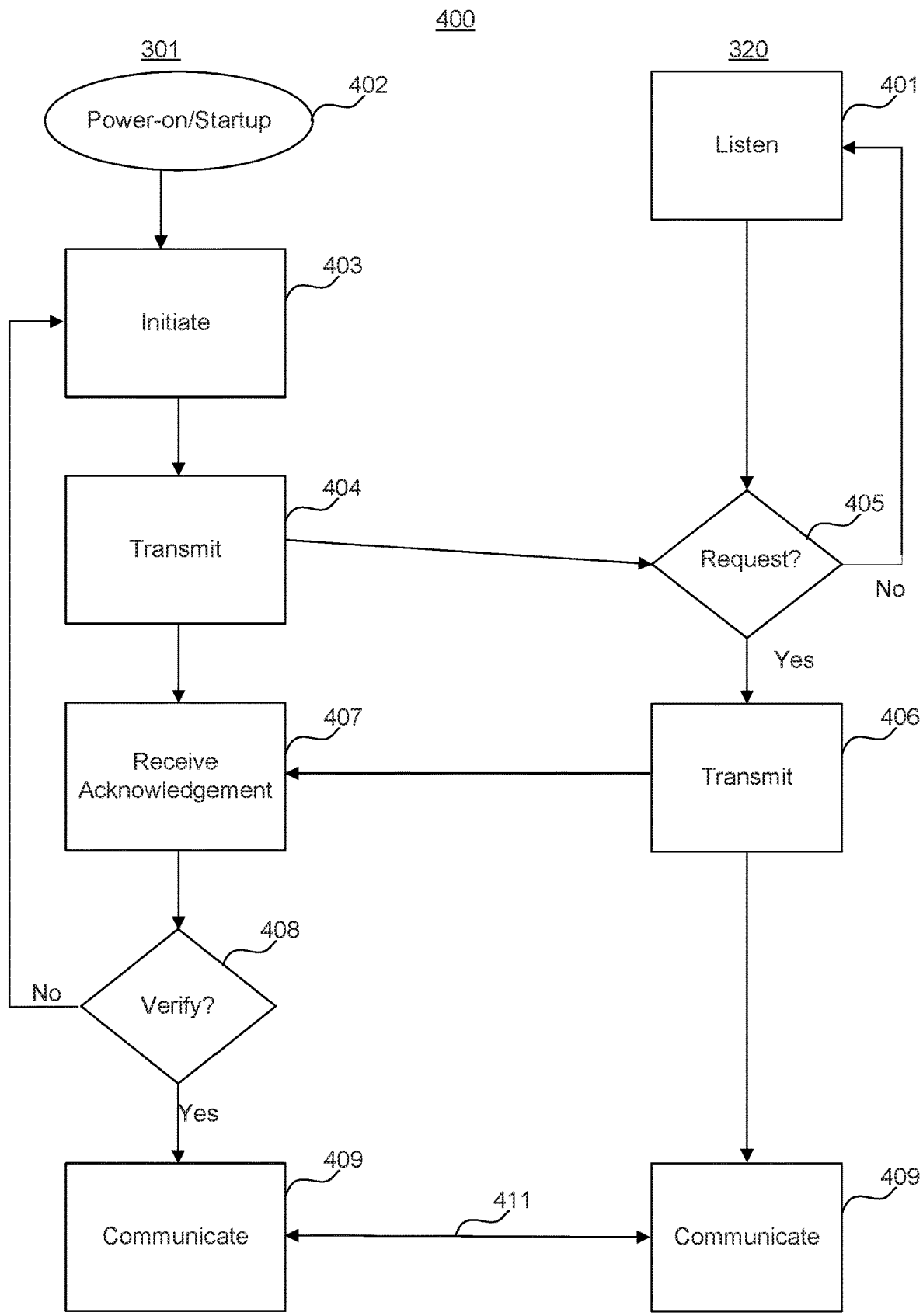
FIG. 4 illustrates a flowchart of a CPE real-time event capture and notification system, according to an example embodiment.
Figure 5:
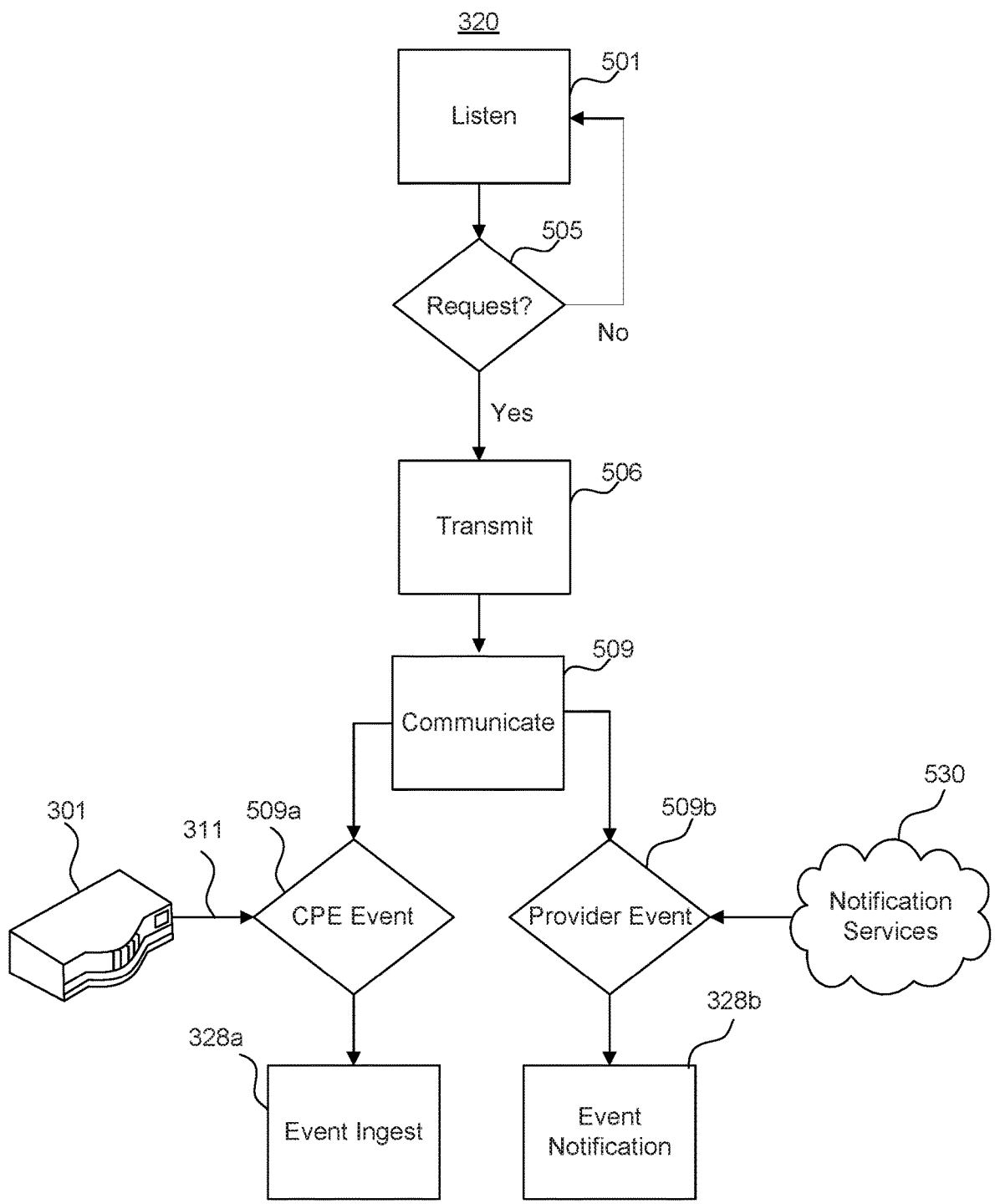

FIG. 4 is a flowchart of exemplary operational steps in a CPE real-time event capture and notification method 400. FIG. 5 is a flowchart of exemplary operational steps in a CPE device In the ECN operational control flow 400, at operation 401, server 320 can listen on at least one IP enabled port for a request (e.g., an HTTP request) that includes a Websocket upgrade request.

At operation 402, client device 301 may enter a state causing initialization of a communication request process. In a non-limiting example, operation 402 may be entered by a client device 301 when a network connection is established, such as device power-on or upon reestablishing an interrupted network connection.

At operation 403, client device 301 may initiate a process for generating a full-duplex communication request. For example, client device 301 may initiate a Websocket request by generating a Websocket request header, i.e., an upgrade request, that may include an authentication "key" to be used in performing a server handshake process described below.

At operation 404, client device transmits the request including the authentication key to server 320. At operation 405, server 320, which has been configured to listen for an upgrade request on at least one port, receives the request and generates an acknowledgement/response. Operation 405 may include performing an authentication operation having a cryptographic function (e.g., generating a secure hash algorithm or SHA) with respect to the key.

At operation 406, server 320 transmits the acknowledgement/response to client device 301, including any cryptographic or hash reply. At operation 407, the client device 301 receives the acknowledgement/response. At operation 408, the client device 301 may determine whether to proceed with communication by the full-duplex channel by inspecting the acknowledgement/response including the SHA hash transmitted by server 320. If the response is not authenticated, client device 301 may again attempt to initiate operation 403 above. Otherwise, if the response is authenticated, client device 301 and server 320 may begin communicating by a full-duplex channel 311, e.g., by Websocket protocol, at operation 409.

Unlike an HTTP connection, which is repeatedly created and destroyed, the full-duplex communication (e.g., Websocket) channel may be persistent, requiring no substantial maintenance or overhead to maintain the channel. As a result, the bandwidth requirement of the ongoing Websocket connection may be minimal, essentially the size of data packets necessary to communicate information about associated events. On the other hand, a channel that relies on HTTP protocol may require one hundred times, or more, the bandwidth of the full-duplex communication channel as a result of continuous and inefficient creation, destruction and recreation of connections.

FIG. 5 is a flowchart showing exemplary operational steps of a server 320 as a component of CPE real-time event capture and notification method 400. As described above, at operation 501, server 320 listens on at least one IP enabled port for a request that includes a Websocket upgrade request.

At operation 505, server 320 receives an incoming upgrade request including an authentication key from client device 301. Server 320 generates an acknowledgement/response. In an embodiment, the acknowledgement/response includes SHA hash with respect to the key. At operation 506, server 320 transmits the acknowledgement/response to client device 301, including the SHA hash. At operation 509, server 320 may begin communicating with client device 301 by a full-duplex communication channel 311, e.g., by Websocket protocol. In operation 509a, upon receiving a captured event from client device 301 through full-duplex communication channel 311, server 320 executes an event ingest module 328a, as described above. Alternatively or additionally, in operation 509b, upon receiving an event from one or more notification services 530, server 320 executes an event notification module 328b, as described above.

E. ECN System Including Data Warehousing System

Figure 6:
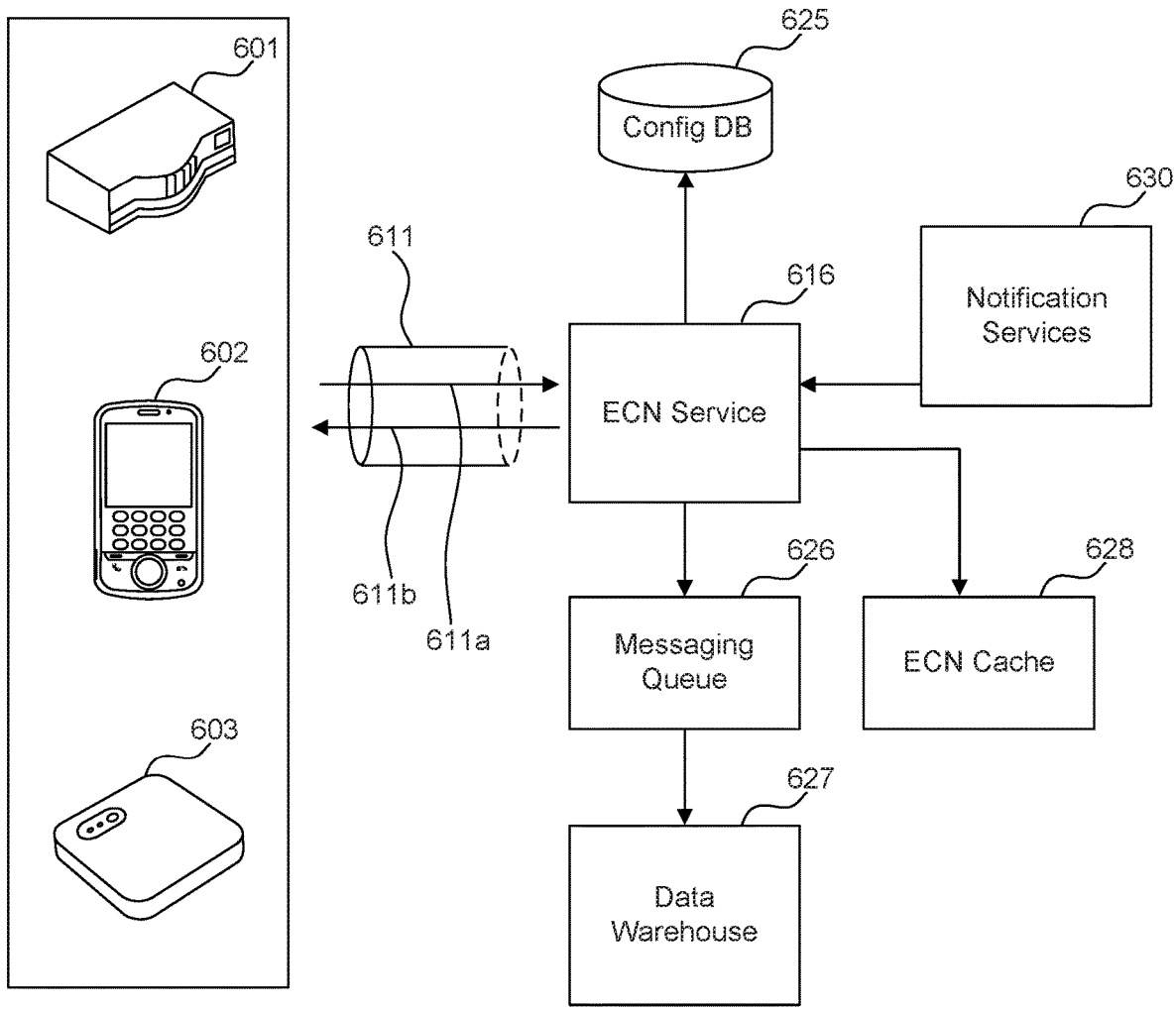
FIG. 6 illustrates a message queuing application of a CPE real-time event capture and notification system, according to an example embodiment.
Figure 7:
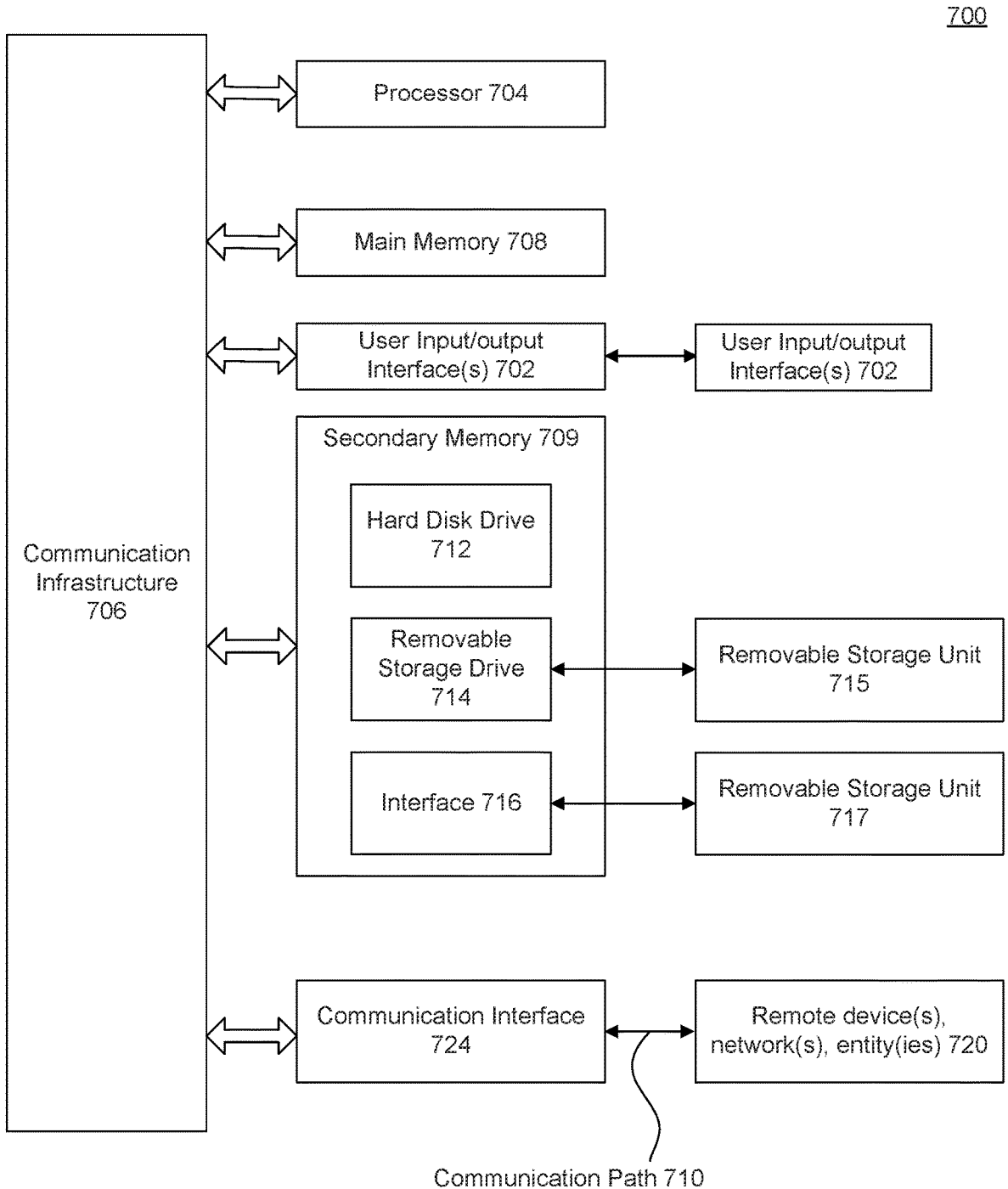
FIG. 7 illustrates an example computing device, according to an example embodiment.

FIG. 6 depicts an ECN System 600 that includes data warehousing systems to for further processing and analytics. As shown in FIG. 6, ECN system 600 includes ECN service 616, which may comprise a server, components and modules as described in this disclosure.

ECN system 600 includes a messaging queue 626 configured to automatically or on-demand enqueue message data that comprise notifications transmitted by or to ECN service 616. For example, one or more notifications received by ECN service 616 from, for example, one or more client devices (e.g., 601 to 603 via transmission 611b of full-duplex communication channel 611) and/or notification services 630 may be enqueued to downstream applications by messaging queue 626. Likewise, one or more notifications transmitted by ECN service 616 (via transmission 611a of full-duplex communication channel 611) may be enqueued by messaging queue 626.

A message queue (also referred to as a message broker) may include one or more servers (not shown) executing one or more stream-processing applications (such as Kafka or Storm by Apache Software Foundation, etc.) In an embodiment, data processed and comprised by message queue 626 may be distributed among one or more cluster architectures (not shown), providing scalability and high throughput. Messages enqueued by messaging queue 626 may be communicated, for example, to data warehouse 627.

Data warehouse 627 may include one or more servers (not shown) configured to receive messages streamed, in real time, on-demand or both, and store the messages. In a non-limiting example, one or more messages received from message queue 626 may be stored by data warehouse 627 for seven days. Data warehouse 627 may also be configured to execute one or more data processing or analytics applications to process for analysis and/or analyze In an embodiment, ECN system 600 may also include ECN cache 628 that may include a storage device or process configured to store the above-mentioned notifications received by or transmitted by ECN service 616.

In an embodiment, ECN system 600 may include a configuration database 625 that may include configuration information and other information required to maintain and administer the message broker cluster architecture.

The use of a messaging queue enables real-time notifications with respect to the ECN System 600 to be distributed and warehoused with high throughput. Such an arrangement also permits the ECN system 600 to be a highly scalable interface between the ECN service 616 and applications, such as data warehouse 627.

F. Example Computing Device Enabled for Real-Time ECN

Computer system 700 includes one or more processors, such as processor 704.

Processor 704 may comprise suitable logic, circuitry, dedicated circuits, and/or code that may enable processing data and/or controlling operations of computer system 700. Processor 704 can be a special purpose or a general purpose processor. Processor 704 may be connected to a communication infrastructure 706 (for example, a bus or network). Processor 704 may be enabled to provide control signals to the various other portions of computer system 700 via communication infrastructure 706, for example.

Computer system 700 also includes a main memory 708, and may also include a secondary memory 709. Secondary memory 709 may include, for example, a hard disk drive 712, a removable storage drive 714, and/or a memory stick. Removable storage drive 714 may comprise a floppy disk drive, a magnetic tape drive, an optical disk drive, a flash memory, or the like. The removable storage drive 714 reads from and/or writes to a removable storage unit 715 in a well-known manner. Removable storage unit 715 may comprise a floppy disk, magnetic tape, optical disk, etc. that is read by and written to by removable storage drive 714. As will be appreciated by persons skilled in the relevant art(s), removable storage unit 715 includes a computer usable storage medium having stored therein computer software and/or data.

In alternative implementations, secondary memory 709 may include other similar means for allowing computer programs or other instructions to be loaded into computer system 700. Such means may include, for example, a removable storage unit 717 and an interface 716. Examples of such means may include a program cartridge and cartridge interface (such as that found in video game devices), a removable memory chip (such as an EPROM, or PROM) and associated socket, and other removable storage units 717 and interfaces 716 that allow software and data to be transferred from the removable storage unit 717 to computer system 700.

Computer system 700 may also include a communications interface 724. Communications interface 724 allows software and data to be transferred between computer system 700 and external devices (such as a server of one or more embodiments as described above) 720. Communications interface 724 may include a modem, a network interface (such as an Ethernet card), a communications port, a PCMCIA slot and card, or the like. Software and data transferred via communications interface 724 are in the form of signals that may be electronic, electromagnetic, optical, or other signals capable of being received by communications interface 724. These signals are provided to communications interface 724 via a communications path 710. Communications path 710 carries signals and may be implemented using wire or cable, fiber optics, a phone line, a cellular phone link, an RF link or other communications channels. As in the disclosed embodiments, communications path 710 may be configured to enable communications between computer system 700 and external devices such as server 720 in real time, for example, utilizing a full-duplex communication channel.

In this document, the terms "computer program medium" and "computer usable medium" are used to generally refer to media such as removable storage unit 715, removable storage unit 717, and a hard disk installed in hard disk drive 712. Computer program medium and computer usable medium can also refer to memories, such as main memory 708 and secondary memory 709, which can be memory semiconductors (e.g., DRAMs, etc.). These computer program products are means for providing software to computer system 700.

Computer programs (also called computer control logic) are stored in main memory 708 and/or secondary memory 709. Computer programs may also be received via communications interface 724. Such computer programs, when executed, enable computer system 700 to implement the embodiments as discussed herein. In particular, the computer programs, when executed, enable processor 704 to implement the disclosed processes, such as the operations in the method 400 of FIGS. 4 and 5, as discussed above. Accordingly, such computer programs represent controllers of the computer system 700. Where the embodiments are implemented using software, the software may be stored in a computer program product and loaded into computer system 700 using removable storage drive 714, interface 716, hard drive 712 or communications interface 724. This can be accomplished, for example, through the use of general-programming languages (such as C or C++). The computer program code can be disposed in any known computer-readable medium including semiconductor, magnetic disk, or optical disk (such as, CD-ROM, DVD-ROM). As such, the code can be transmitted over communication networks including the Internet and internets. It is understood that the functions accomplished and/or structure provided by the systems and techniques described above can be represented in a core (such as a processing-unit core) that is embodied in program code and may be transformed to hardware as part of the production of integrated circuits. This can be accomplished, for example, through the use of hardware description languages (HDL) including Verilog HDL, VHDL, Altera HDL (AHDL) and so on, or other available programming and/or schematic-capture tools (such as, circuit-capture tools).

Embodiments are also directed to computer program products comprising software stored on any non-transitory computer useable medium. Such software, when executed in one or more data processing device, causes a data processing device(s) to operate as described herein. Embodiments employ any computer useable or readable medium, known now or in the future. Examples of computer useable mediums include, but are not limited to, primary storage devices (e.g., any type of random access memory), secondary storage devices (e.g., hard drives, floppy disks, CD ROMS, ZIP disks, tapes, magnetic storage devices, optical storage devices, MEMS, nanotechnological storage device, etc.), and communication mediums (e.g., wired and wireless communications networks, local area networks, wide area networks, intranets, etc.).

It is to be appreciated that the Detailed Description section, and not the Summary and Abstract sections, is intended to be used to interpret the claims. The Summary and Abstract sections may set forth one or more but not all exemplary embodiments as contemplated by the inventor(s), and thus, are not intended to limit the embodiments and the appended claims in any way.

The accompanying drawings, which are incorporated herein and form part of the specification, illustrate the embodiments and, together with the description, further serve to explain the principles of the embodiments and to enable a person skilled in the pertinent art to make and use the embodiments. The embodiments will be described with reference to the accompanying drawings. Generally, the drawing in which an element first appears is typically indicated by the leftmost digit(s) in the corresponding reference number.

The breadth and scope of the present invention should not be limited by any of the above-described embodiments, but should be defined only in accordance with the following claims and their equivalents.

What is claimed is:

1. A method for communicating with a server, the method comprising:
   establishing a persistent communication channel between a client device and the server upon occurrence of an initializing event associated with the client device;
   communicating a plurality of event messages in real time to the server via the persistent communication channel;
   receiving at least one content message in real time from the server via the persistent communication channel, the content message corresponding to content targeted based on at least one of the plurality of event messages;
   deactivating and closing the persistent communication channel upon occurrence of a terminating event associated with the client device; and
   leaving the persistent communication channel open before the terminating event even though event messages are not being communicated between the client device and the server,
   wherein the initializing event comprises establishing a network connection of the client device, powering-on the client device, initializing the client device, or associating of the client device, and wherein the terminating event comprises a powering-off event or a de-initializing event of the client device.

2. The method of claim 1, wherein the persistent communication channel is a full-duplex communication channel.

3. The method of claim 2, wherein the persistent communication channel utilizes a websocket internet protocol.

4. The method of claim 1, further comprising automatically reconnecting the persistent communication channel in response to a termination of the persistent communication channel.

5. The method of claim 1, wherein the client device comprises a customer premises equipment (CPE) device.

6. The method of claim 1, wherein at least one of the plurality of event messages comprises channel viewing data of the client device enabling one or more advertisements to be selected for communication to the client device.

7. The method of claim 1, wherein the terminating event disconnects communication between the client device and the server.

8. A method for communicating with a server, the method comprising:
   generating, by a client device, an authentication key;
   establishing a first communication channel between the client device and the server;
   transmitting, by the client device and through the first communication channel, a request for a second communication channel between the client device and the server, the request comprising the authentication key;
   establishing the second communication channel between the client device and the server;
   outputting, by the client device, a first signal comprising first video content to a display device;
   transmitting, by the client device and using the second communication channel, a first real-time information to the server, the first real-time information identifying the first video content;
   receiving, by the client device, at least one content message in real time from the server via the second communication channel, the content message corresponding to content targeted based on at least the first real-time information; and
   leaving the second communication channel open before a terminating event even though information is not being communicated between the client device and the server,
   wherein the client device is one of a set top box, a mobile device or an IPTV client,
   wherein the second channel is a full-duplex connection communication channel,
   wherein the initializing event comprises establishing a network connection of the client device, powering-on the client device, initializing the client device, or associating of the client device, and
   wherein the terminating event comprises a powering-off event or a de-initializing event of the client device.

9. The method of claim 8, wherein the second communication channel is a full-duplex communication channel that utilizes a websocket internet protocol.

10. The method of claim 8, further comprising:
    receiving, by the client device, an instruction from the server to display second video content, wherein the second video content is targeted to the client device based on the first real-time information; and
    outputting a second signal to a display device comprising the second video content.

11. The method of claim 10, wherein the second video content is an advertisement selected based on the first real-time information.

12. The method of claim 8, further comprising receiving, by the client device and using the second communication channel, second real-time information from the server.

13. The method of claim 8, further comprising transmitting, by the client device and using the second communication channel, third real-time information to the server.

14. The method of claim 8, wherein the first real-time information comprises television content viewing information identifying television content that a user of the client device views in real time.

15. A device comprising:
    a memory; and
    a processor, coupled to the memory and based on instructions stored in the memory, configured to perform:
      an initialization process that comprises establishing a communication channel between the device and a server upon occurrence of an initializing event associated with the device;
      a communication process that comprises:
        communicating a plurality of event messages to the server via the communication channel;
        receiving, by the device, at least one content message in real time from the server, via the communication channel, the content message corresponding to content targeted based on at least one of the plurality of event messages; and
        leaving the communication channel open before a terminating event even though event messages are not being communicated between the device and the server; and
      a deactivation process that comprises deactivating and closing the communication channel upon occurrence of the terminating event associated with the device,
    wherein the initializing event comprises establishing a network connection of the device, powering-on the device, initializing the device, or associating of the device, and
    wherein the terminating event comprises a powering-off event or a de-initializing event of the device.

16. The device of claim 15, wherein the communication channel is a full-duplex communication channel.

17. The device of claim 16, wherein the communication channel utilizes a websocket internet protocol.

18. The device of claim 15, wherein the processor is configured to perform a reconnection process comprising automatically reconnecting the communication channel in response to a termination of the communication channel.

19. The device of claim 15, wherein the device is a customer premises equipment (CPE) device.

20. A server for receiving a real-time event notification from a plurality of client devices, the server comprising:
    a memory; and
    a processor, coupled to the memory and based on instructions stored in the memory, configured to:
      establish a communication channel between a client device from among the plurality of client devices and the server upon occurrence of an initializing event associated with the client device;
      receive a plurality of event messages from the client device via the communication channel;
      receive at least one content message in real time from the client device via the communication channel, the content message corresponding to content targeted based on at least one of the plurality of event messages;

deactivate and close the communication channel upon occurrence of a terminating event associated with the client device; and leave the communication channel open before the terminating event even though event messages are not being communicated between the client device and the server, wherein the initializing event comprises establishing a network connection of the client device, powering-on the client device, initializing the client device, or associating of the client device, and wherein the terminating event comprises a powering-off event or a de-initializing event of the client device.

21. The server of claim 20, wherein the communication channel is a full-duplex communication channel.

22. The server of claim 21, wherein the communication channel utilizes a websocket internet protocol.

23. The server of claim 20, wherein the processor is further configured to automatically reconnect the communication channel in response to a termination of the communication channel.

24. The server of claim 20, wherein the plurality of client devices comprises at least one customer premises equipment (CPE) device.

* * * * *